United States Patent
Banat et al.

(10) Patent No.: US 11,020,752 B2
(45) Date of Patent: Jun. 1, 2021

(54) PROCESS FOR HEAT STABLE SALTS REMOVAL FROM SOLVENTS

(71) Applicant: Khalifa University of Science and Technology, Abu Dhabi (AE)

(72) Inventors: Fawzi Ahmed Ibraheem Banat, Abu Dhabi (AE); Emad Yousef Mahmoud Alhseinat, Abu Dhabi (AE); Priyabrata Pal, Abu Dhabi (AE); Anjali Achazhiyath Edathil, Abu Dhabi (AE)

(73) Assignee: KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 0 days.

(21) Appl. No.: 16/339,479

(22) PCT Filed: Oct. 5, 2016

(86) PCT No.: PCT/IB2016/055945
§ 371 (c)(1),
(2) Date: Apr. 4, 2019

(87) PCT Pub. No.: WO2018/065802
PCT Pub. Date: Apr. 12, 2018

(65) Prior Publication Data
US 2019/0240675 A1 Aug. 8, 2019

(51) Int. Cl.
*B03C 1/01* (2006.01)
*B01D 43/00* (2006.01)
(Continued)

(52) U.S. Cl.
CPC ............ *B03C 1/01* (2013.01); *B01D 43/00* (2013.01); *B01D 53/1425* (2013.01);
(Continued)

(58) Field of Classification Search
CPC ........ B01D 53/1425; B01D 2252/204; B03C 1/00; B03C 1/01; B03C 2201/18; C02F 1/265; C02F 1/488
(Continued)

(56) References Cited

U.S. PATENT DOCUMENTS

| 4,071,602 A | 1/1978 | Pearce |
| 5,910,611 A | 6/1999 | Gregory, Jr. et al. |

(Continued)

FOREIGN PATENT DOCUMENTS

| CN | 105132367 A | 12/2015 |
| WO | 02094350 A2 | 11/2002 |
| WO | 2015044446 A1 | 4/2015 |

OTHER PUBLICATIONS

Dumée et al, "Purification of aqueous amine solvents used in post combustion CO2 capture: A review", International Journal of Greenhouse Gas Control, vol. 10, pp. 443-455 (Year: 2012).*

(Continued)

*Primary Examiner* — Claire A Norris
(74) *Attorney, Agent, or Firm* — Steven M. Shape; Dennemeyer & Associates, LLC

(57) ABSTRACT

An apparatus and a method for removing salts from a liquid are described. A first liquid containing at least one salt is mixed with magnetic composite particles. A subsequent separation of the particles from the liquid is achieved using an electromagnetic source.

12 Claims, 8 Drawing Sheets

(51) Int. Cl.
    *B01D 53/14*     (2006.01)
    *C10G 70/00*     (2006.01)
    *B01D 53/96*     (2006.01)
    *B03C 1/033*     (2006.01)
    *C10G 70/04*     (2006.01)

(52) U.S. Cl.
    CPC ......... *B01D 53/1462* (2013.01); *B01D 53/96* (2013.01); *B03C 1/0335* (2013.01); *C10G 70/00* (2013.01); *C10G 70/046* (2013.01); *B01D 2252/204* (2013.01); *B01D 2252/20489* (2013.01); *B03C 2201/18* (2013.01); *B03C 2201/20* (2013.01); *C10G 2300/4081* (2013.01)

(58) Field of Classification Search
    USPC .................................................. 210/695, 222
    See application file for complete search history.

(56) References Cited

U.S. PATENT DOCUMENTS

| | | | |
|---|---|---|---|
| 6,767,635 | B1 | 7/2004 | Bahr et al. |
| 2008/0011683 | A1* | 1/2008 | Dong ................... B01J 20/3244 |
| | | | 210/662 |
| 2012/0018382 | A1* | 1/2012 | Stein ........................ B03C 1/00 |
| | | | 210/663 |
| 2015/0368126 | A1* | 12/2015 | Predescu ............... B03C 1/0335 |
| | | | 210/695 |
| 2016/0264846 | A1* | 9/2016 | Bennetzen .............. E21B 43/20 |

OTHER PUBLICATIONS

Austrian Patent Office, International Search Report with the Written Opinion of the International Searching Authority, dated Jan. 13, 2017, World Intellectual Property Office, Vienna.

* cited by examiner

PROCESS FOR HEAT STABLE SALTS REMOVAL FROM SOLVENTS

CROSS-REFERENCE TO RELATED APPLICATIONS

This is a 35 U.S.C. 371 National Stage Patent Application of International Application No. PCT/IB2016/055945, filed Oct. 5, 2016, which is hereby incorporated by reference in its entirety.

The current invention arises from the efforts that have been taken place as a part of the ongoing project studying removal of heat stable salts (HSS) from solvents. The project is funded by the Petroleum Institute Gas Processing and Materials Science Research Center (GRC). These efforts have led to the development of a new method and process for HSS removal from solvents.

BACKGROUND

There are several processes, i.e. gas sweetening, where it is needed to use solvents, especially amine solvents, to absorb gases such as H2S and CO2. Especially all amine solvents are prone for Heat Stable Salts generation such as sulfates, thiosulfates, chlorides, formates, acetates, oxalates, glycolates, etc. Heat-stable-salts (HSS) are formed in such cases from amine degradation products and some of the contaminants in the process water mixed with the amine.

Heat-stable-salts (HSS) cannot be removed by conventional regeneration process i.e. stripping. The accumulation of these HSS makes the acid gases absorption become less stable. The accumulation of HSS in solvents like amine solvents may lead to the corrosion and fouling of the process equi-pment, and in turn short life of the equipment. Moreover, these HSS contribute to solution foaming which cause the losses of in particular amine and other serious problems. Therefore, the removal of these HSS from the amine solvents is especially crucial for amine absorption processes.

Usually, an ion-exchange (IE) method is applied to separate HSS from amine solvents. See U.S. Pat. Nos. 4,170,628, 4,122,149, 4,113,849 and 4,071,602. These patents use ion exchange resins to remove heat stable salts from amines solvents.

However, the cost of IE method is relatively high. The frequent regeneration of exchange resin may cause serious second pollution due to the production of acid and alkaline wastewaters. Ion-exchange (IE) method requires a significant amount of acid and base solutions for regeneration, mostly at higher feed salt concentrations, and this represent the major cost of the regeneration process. Further regeneration produces a large volume of waste solution which requires neutralization and disposal. As with new advances in ion exchange processes, the requirements for regeneration chemicals have reduced. Resins degrade over time due to fouling by organics, and suspended particles, which requires periodic cleaning and replacement. In addition, cationic resins can capture protonated amines thus leading to amine losses. Similarly, if the amine loading is too high, bicarbonate anions can be removed along with the anions of interest.

Another process for HSS removal from amine solvent is Electro dialysis (ED). The use of Electro dialysis (ED) for amine purification is investigated in numerous studies. This ED approach was demonstrated to remove contaminants from amine solutions. There are some proposed configurations of ED in different patents for solvent reclamation and heat stable salts removal. The patent CA1334836 C involves an ED method for removing heat-stable salt from contaminated amine solvents. The latter is treated by a base addition to neutralize the heat stable amine salts prior passing the electrodialysis step.

ED has anionic and cationic membranes; replacing these membranes is costly, time-consuming, and disruptive, as the flow of the fluid being processed may have to be stopped for a period of time. Further, disposal of used membranes items may not be environmentally friendly. The anionic and cationic ED membranes should have low electrical resistance, and have high thermal and mechanical stability. The ED electrodes are usually made of titanium and plated with platinum. Electro-dialysis for amine purification is best operated at a low temperature. Neutralization with a base such as KOH, or NaOH, and microfiltration are usually required upstream of the ED unit. Filtration in general can cause loss of amine.

The presence of suspended solids, hydrocarbons, or dissolved iron in the amine solution can cause fouling on the membrane surface, thus increasing the membrane resistance and reducing the process efficiency. If amine recovery is high, ion removal rates are lowered and ion removal rates is high, amine loss through the membrane is high.

A further disadvantage is that some of the anions and the protonated amine can be transferred and lost in the process. In addition, the expected lifespan for anion-exchange membranes is 10 years, and for cation-exchange membranes is 15 years. Many membranes are designed for a pH range from 2 to 9, and the typical pH range of lean amine solutions is pH 9-11 which may cause membrane failure.

SUMMARY OF THE INVENTION

It is an object of the present invention to provide an apparatus and a method for heat stable salts removal from solvents, especially from amine solvents.

It is another object of the present invention to provide an apparatus and a method that can be installed in running units for continues removal of HSS from amine solvents.

It is a further object of the present invention to provide an improved apparatus and an improved method for HSS removal from solvents, especially from amine solvents.

It is moreover an object of the present invention to provide an apparatus and a method for HSS removal from solvents, especially from amine solvents, which overcome one or more of the aforementioned problems associated with conventional HSS removal techniques.

In order to achieve one or more of the mentioned objects, the present invention provides an apparatus for removing salts from a liquid comprising:
- a first liquid containing at least one salt,
- magnetic composite particles,
- a tank 2 for storing the first liquid containing at least one salt,
- a mixing tank 4 in fluid communication with the tank 2 for mixing the first liquid containing at least one salt with the magnetic composite particles, and
- an electromagnetic separator 5 in fluid communication with the mixing tank 4, wherein the electromagnetic separator 5 comprises an electromagnetic source 6.

It is preferable for the apparatus according to the invention that the first liquid is an aqueous amine solvent, wherein it is more preferred that amine solvent comprises at least one of methyldiethanolamine and alkanolamine. It is also preferable that at least one salt is formed by one or more protonated amine cations and one or more anions selected from $SCN^-$, $HCOO^-$, $CH_3COO^-$, and $CH_3CH_2COO^-$. The magnetic composite particles in the apparatus according to the invention preferably comprise iron oxide magnetic particles and/or alginate.

It is also preferred that the apparatus according comprises one or more and most preferably all of the following additional materials and components:
- a second liquid for cleaning the magnetic composite particles from adsorbed salt and a tank 3 in fluid communication with the mixing tank 4 for storing the second liquid, wherein the second liquid is preferably water;
- a treated liquid tank 7 in fluid communication with the electromagnetic separator 5 for collecting first liquid which has been treated in the mixing tank 4;
- a collecting tank 8 in fluid communication with the electromagnetic separator 5 and in fluid communication with the tank 3 for collecting the second liquid containing magnetic composite particles having at least a portion of the at least one salt adsorbed thereon.

In a particularly preferred embodiment the apparatus according to the invention has the following features:
- the first liquid is an aqueous amine solvent, preferably comprising at least one of methyldiethanolamine and alkanolamine,
- the at least one salt is formed by one or more protonated amine cations and one or more anions selected from $SON^-$, $HCOO^-$, $CH_3COO^-$, and $CH_3CH_2COO^-$,
- the magnetic composite particles comprise iron oxide magnetic particles and alginate,
- the apparatus further comprises a second liquid for cleaning the magnetic composite particles from adsorbed salt and a tank 3 in fluid communication with the mixing tank 4 for storing the second liquid, wherein the second liquid is preferably water;
- the apparatus further comprises a collection tank 7 in fluid communication with the electromagnetic separator 5 for collecting first liquid which has been treated in the mixing tank 4,
- the apparatus further comprises a treated liquid tank 7 in fluid communication with the electromagnetic separator 5 for collecting first liquid which has been treated in the mixing tank 4, and
- the apparatus further comprises a collecting tank 8 in fluid communication with the electromagnetic separator 5 and in fluid communication with the tank 3 for collecting the second liquid containing magnetic composite particles having at least a portion of the at least one salt adsorbed thereon.

In order to achieve one or more of the afore-mentioned objects, the present invention further provides a method for removing salts from a liquid comprising the steps:
- providing a first liquid containing at least one salt,
- feeding magnetic composite particles to the liquid and mixing the magnetic composite particles with the first liquid, and
- separating the magnetic composite particles having at least a portion of the at least one salt adsorbed on the magnetic composite particles from the first liquid using an electromagnetic source.

It is preferable for the method according to the invention that the first liquid is an aqueous amine solvent, wherein it is more preferred that amine solvent comprises at least one of methyldiethanolamine and alkanolamine. It is also preferable that the at least one salt is formed by one or more protonated amine cations and one or more anions selected from $SCN^-$, $HCOO^-$, $CH_3COO^-$, and $CH_3CH_2COO^-$. The magnetic composite particles in the apparatus according to the invention preferably comprise iron oxide magnetic particles and/or alginate.

In a particularly preferred embodiment the afore-described method according to the present invention further comprises a step of discharging a mixture of the magnetic composite particles with the first liquid after mixing the magnetic composite particles with the first liquid in a mixing tank 4 to an electromagnetic separator 5 where a separation takes place by which the magnetic composite particles having at least a portion of the at least one salt adsorbed on the magnetic composite particles are separated from the first liquid by turning on and using an electromagnetic source 6 which is comprised by the electromagnetic separator 5.

In addition to the foregoing step, the method according to the invention further preferably comprises a step of collecting the first liquid after the separation in a treated liquid tank 7.

In addition to the foregoing step, the method according to the invention further preferably comprises a step of feeding a second liquid, which is preferably water, as a regeneration liquid from a tank 3 to the mixing tank 4 and then to the electromagnetic separator 5.

In addition to the foregoing step, the method according to the invention further preferably comprises a step of turning off the electromagnetic source 6 and feeding a mixture of the second liquid and the magnetic composite particles having at least a portion of the at least one salt adsorbed on the magnetic composite particles to a collecting tank 8.

In addition to the foregoing step, the method according to the invention further preferably comprises a step of feeding the mixture in the collecting tank 8 back to the electromagnetic separator 5 and turning on the electromagnetic source 6 such that the magnetic composite particles are trapped in the electromagnetic separator 5.

In addition to the foregoing step, the method according to the invention further preferably comprises a step of feeding the second liquid from the electromagnetic separator 5 to the collecting tank 8, and further feeding the second liquid from the collecting tank 8 to the tank 3.

In addition to the foregoing step, the method according to the invention further preferably comprises a step of feeding additional first liquid from a tank 2 via the mixing tank 4 to the electromagnetic separator 5, turning off the electromagnetic source 6 and feeding a mixture of the magnetic composite particles and the first liquid to the mixing tank 4.

It is seen that the present invention provides an apparatus and a method for HSS removal from solvent, preferably amine solvent, using magnetic composite microparticles (MOM). In this regard, Heat Stable Salts (HSS) in the solvent, preferably the amine solvent, are adsorbed in MCM and then removed using electromagnetic separator. The contaminated MCM is then preferably reactivated and reused. Accordingly, magnetic composite microparticles (MCM) are used for HSS removal. Preferably, magnetic particles are prepared and then mixed with a polymer, preferably an alginate polymer, so that magnetic composite microparticles are achieved. Amine solvent as used herein refers to a solution, preferably an aqueous solution, containing one or more amine compounds. Amine compounds include primary amines, secondary amines, tertiary amines, protonated amines and quaternary ammonium compounds. The organic residues attached to the amine nitrogen include e.g. alkyls, alcohols and alkanols. Preferred amines are methyldiethanolamine and alkanolamine.

BRIEF DESCRIPTION OF THE DRAWINGS

The present invention will be described with reference to the accompanying drawings of which.

DETAILED DESCRIPTION OF THE INVENTION

Figure 1:
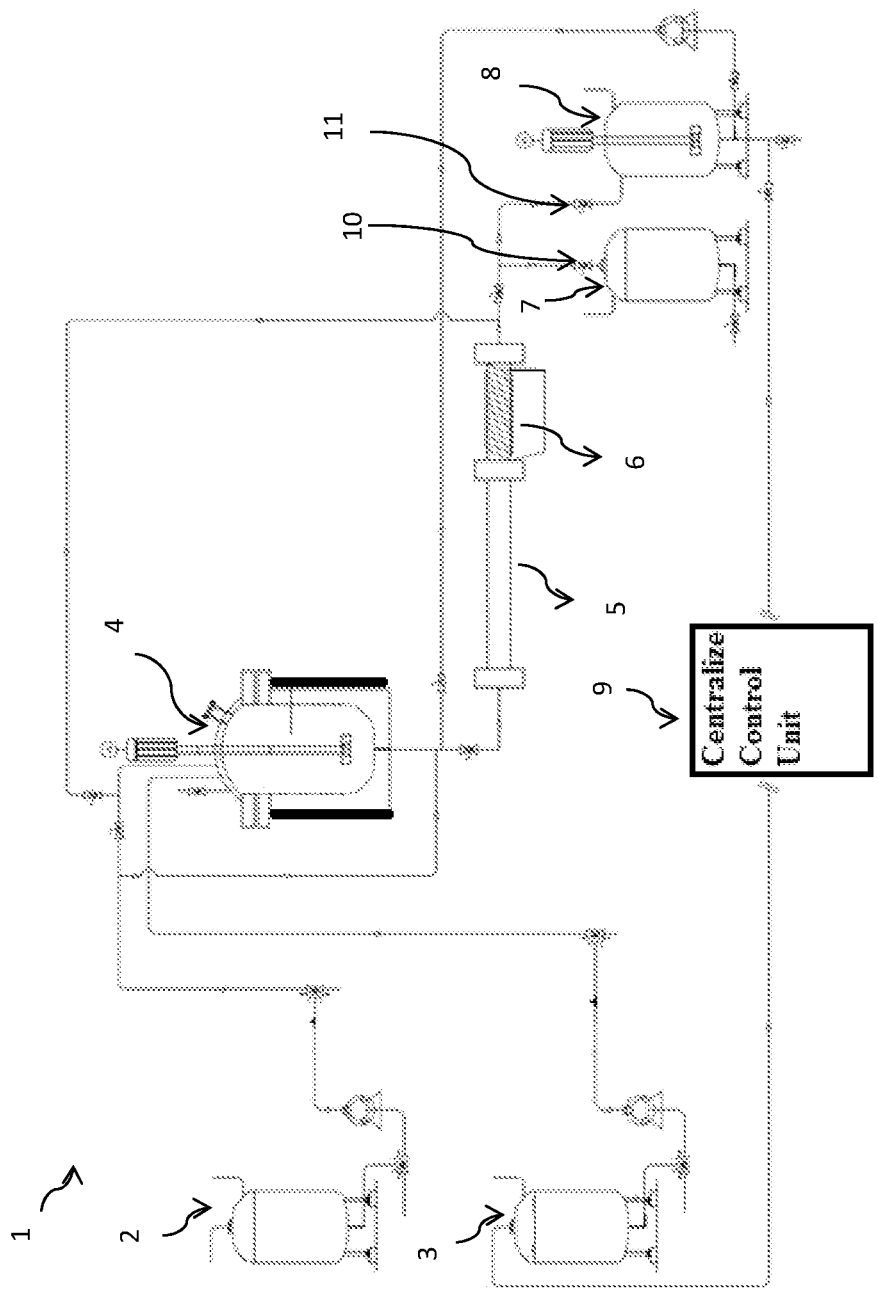
FIG. 1 is a schematic diagram for the fully automated process according to the invention where MCM are interacted with the treated amine solvent then reactivated and re-injected back for further reuse.

The present invention is generally applicable, and is advantageously especially usable for HSS removal from amine solvents. It is used for the removal of HSS before they accumulate further in the amine solvent unit and deteriorate its quality and performance. The present invention provides a fully automated method to continuously remove HSS from amine solvents. Heat Stable Salts (HSS) in a solvent and more preferably in an amine solvent are adsorbed in MCM and then removed using an electromagnetic separator. The contaminated MCM is then preferably reactivated and reused. Any industry that needs to remove contaminates from a fluid using magnetic particles can benefit from the proposed process. In an especially preferred embodiment, the proposed process can be integrated readily with running natural gas sweetening absorption processes.

Examples of units where amine solvents come in contact with gas stream and are prone to HSS generation and accumulation include dehydration units and gas sweetening units. The present invention can also be used on amine solvents that are used to process hydrocarbon liquids.

Methyldiethanolamine and alkanolamine solutions in general are used in gas sweetening process to strip acid gases, specifically carbon dioxide and hydrogen sulfide. Amine solvents are characterized by their high selectivity to absorb these acid gases. The acid gases are considered as corrosive agents; the existence of acid gases with liquid water in the process vessels and pipes threatens their structures from corrosion. The acid gases should be removed and kept below the preferred design specification of 4-20 ppm $H_2S$ and <3% $CO_2$.

During the absorption of $H_2S$ and $CO_2$ by-products such as $SON^-$, $HCOO^-$, $CH_3COO^-$, and $CH_3CH_2COO^-$ are produced by the reaction between oxygen and $H_2S$ and $CO_2$. These by-products and the protonated amine form a heat stable salt (HSS) system, which could not be removed by system regenerator. The accumulation of these HSS makes the acid gases absorption become less stable. The increase of HSS in solution may lead to the corrosion and fouling of the equipment, and in turn short life of the equipment. Moreover, these HSS contribute to solution foaming which causes the losses of amine and other serious problems. Therefore, the removal of these HSS from the amine solvents is crucial for amine absorption processes.

The present invention can be installed in the lean amine cycle and provide continuous removal of HSS from amine solvents. The present invention introduced the use of magnetic composite microparticles (MCM) to adsorb and remove HSS from amine solvents. HSS can be removed before they accumulate in the amine solvent and deteriorate its quality and performance. The best place to install the presented process 1 in a running amine unit depends in the unit design and configuration, each unit should be dealt with separately; however, the best place for gas sweetening unit can be on the lean amine stream either before the rich-lean heat exchanger to benefit from the high temperature of lean amine around (120° C.) before reducing it down in the heat exchanger or after the rich-lean heat exchanger.

A particularly preferred continuous HSS removal process 1 has a lean amine tank 2, a cleaning solution tank for MCM reactivation 3, a mixing tank 4 to mix the MCM with the untreated amine solvent, an electromagnetic separator 5 equipped with electromagnetic source 6, a treated amine solvent 7, MCM regenerating and collecting tank 8, and centralize control unit 9.

The operation of the process 1 is described with respect to FIG. 1. The lean amine tank 2 has a solvent inlet that is withdrawn as a side stream from the process solvent i.e. the lean amine stream in amine gas sweetening unit. The untreated amine solvent is pumped to the mixing tank 4; a MCM is manually added to the mixing tank 4. After sufficient time in the mixing tank the amine solvent with the MCM are discharged from the mixing tank to the electromagnetic separator 5. The electromagnetic source 6 is turned on by the central control unit 9 so that the contaminated MCM with HSS are trapped in the electromagnetic separator 5. The treated amine solvent then is collected in treated amine solvent tank 7, the treated amine solvent can then be sent back to the main unit. The central control unit 9 then will close the treated tank inlet valve 10, and open the MCM regenerating and collecting tank inlet tank 11.

The regeneration cycle starts by pumping the regeneration liquid from tank 3 to the mixing tank 4 and then to the electromagnetic separator 5. The electromagnetic source 6 is turned off by the central control unit 9 so the contaminated MCM with HSS are washed from the electromagnetic source 6 by the regeneration solution to the MCM regenerating and collecting tank 8. After sufficient time the regenerated MCM with the regeneration solution are pumped back to the inlet of the electromagnetic separator 5, the electromagnetic source 6 is then turned on by the central control unit 9 so that the reactivated MCM are trapped in the electromagnetic separator 5. The regeneration solvent (water) is then collected in collecting tank 8 and pumped back to the cleaning solution tank 3 for further reuse.

Then the central control unit 9 will pump untreated lean amine solvent from tank 2 for washing the reactivated MCM trapped in the electromagnetic source 6, the electromagnetic source will be turned off by the central control unit 9. The amine solvent with the reactivated MCM will be recycled to the mixing tank 4 for another cycle of removing HSS.

Magnetic Composite Microparticles (MCM) Syntheses and Testing for HSS Removal

A homogenized solution of 1.0 wt % alginate is prepared by mixing sodium alginate in distilled water. Concentration of 1.0 wt % magnetic particles is added to homogenized alginate solution. The magnetic particles are uniformly dispersed in alginate solution by vigorous mixing on a vortex, followed by ultrasound. The resulting suspension is then added dropwise into CaCl$_2$ solution (1M) through a micropipette tip by means of a peristaltic pump. The prepared hydrogels beads are left to cure in the calcium bath overnight in order to ensure complete polymerization. Finally after the curing period, the small magnetic hydrogel beads are recovered using a magnet and washed several times with deionized water to remove the unbound calcium ions. The beads are then dried for two hours at room temperature and stored for further analysis.

Batch Adsorption for Screening:

Adsorption experiments are performed by adding various amounts of magnetic alginate microparticles into a 25 ml conical flask containing 10 ml of Industrial Lean amine solvent. The flask is then allowed to equilibrate on a water bath at 140 rpm for 4 hours. After reaching equilibrium, the magnetic alginate metal oxide composite beads are removed from the Lean amine samples using magnetic force and the Lean amine is filtered. The concentrations of HSS in the Lean amine samples before ($C_i$) and after ($C_e$) adsorption are measured using UVI-vis spectrophotometer.

The adsorption percentage of HSS (% removal) is calculated using following equation:

$$\% \text{ Removal} = \left(\frac{C_i - C_e}{C_i}\right) * 100$$

TABLE 1

Removal of HSS using various magnetic alginate composite sorbents

| Name of adsorbent | Weight, g | LA Volume, ml | Ci, ppb | Ce, ppb | % Removal |
|---|---|---|---|---|---|
| Strontium Ferrite | 1.003 | 10 | 4630 | 4030 | 12.96% |
| Strontium Ferrite | 2.002 | 10 | 4630 | 3790 | 18.14% |
| MgFe$_2$O$_4$ | 1.003 | 10 | 4630 | 4375 | 5.51% |
| ZnFe$_2$O$_4$ | 1.003 | 10 | 4630 | 4235 | 8.53% |
| ZnFe$_2$O$_4$ | 2.002 | 10 | 4630 | 3900 | 15.76% |
| Iron oxide particle | 2.002 | 10 | 4630 | 3770 | 18.57% |

From the screening, it is identified that Iron oxide magnetic particles are found to have the best removal of total HSS (18.57% for 2.0 g MCM) from industrial lean amine solvent. Hence further optimization, kinetics and thermodynamics are carried out using Alginate/Iron oxide magnetic composite.

Kinetics and Thermodynamics Study on Alginate/Iron Oxide Magnetic Composite

Preparation of Iron Oxide Magnetic Nanoparticles

The chemical reagents used for the preparation of iron oxide particles is Ferric chloride: FeCl$_3$.6H$_2$O, Sodium hydroxide: NaOH, and Ethanol.

A typical approach for the synthesis is given as follows: To a homogenized solution of ferric chloride in water, Sodium hydroxide is added and vortexed vigorously until a brownish precipitate is formed. The mixture is then placed inside an oven at 85° C. for 10 hours to remove the excess water. After drying, the brown precipitate is separated by filtration, followed by washing with distilled water. Finally an ethanol wash is performed and the obtained powder particles are oven dried at 85° C.

Synthesis of Alginate/Iron Oxide Magnetic Composite

Initially 1.0 wt % of magnetic iron oxide particles are added to 1.0 wt % homogenized alginate solution. The mixture is allowed to vortex vigorously followed by sonication using ultrasound. The resulting suspension is then added dropwise through a micro pipette tip into CaCl$_2$ solution using a peristaltic pump. The prepared hydrogels beads are left to cure in the calcium chloride solution overnight in order to ensure complete polymerization. Finally after the curing period, the small magnetic hydrogel beads are recovered using a magnet and washed several times with deionized water to remove the unbound calcium ions. The beads are then dried for two hours at room temperature and stored for further analysis.

Magnetic Composite Microparticles (MCM) Characterization

Figure 2:
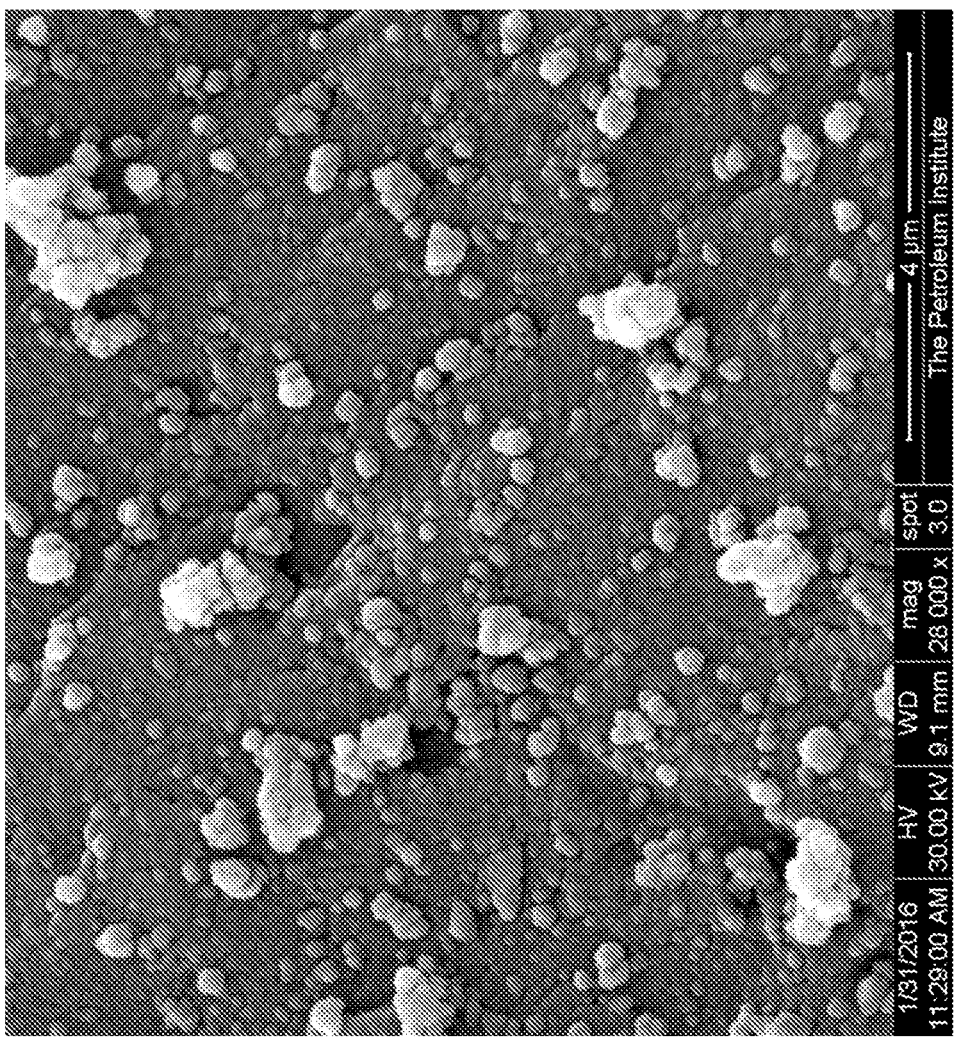
FIG. 2 is an SEM image for the synthesized Iron oxide magnetic particles.

SEM analysis was performed to confirm the morphology of the synthesized iron oxide particles. FIG. 2 shows an SEM image of Iron oxide magnetic particles. The obtained image using scanning electron microscopy clearly shows that the iron oxide particles have spherical shape.

Effect of CaCl$_2$ Concentration

Figure 3:
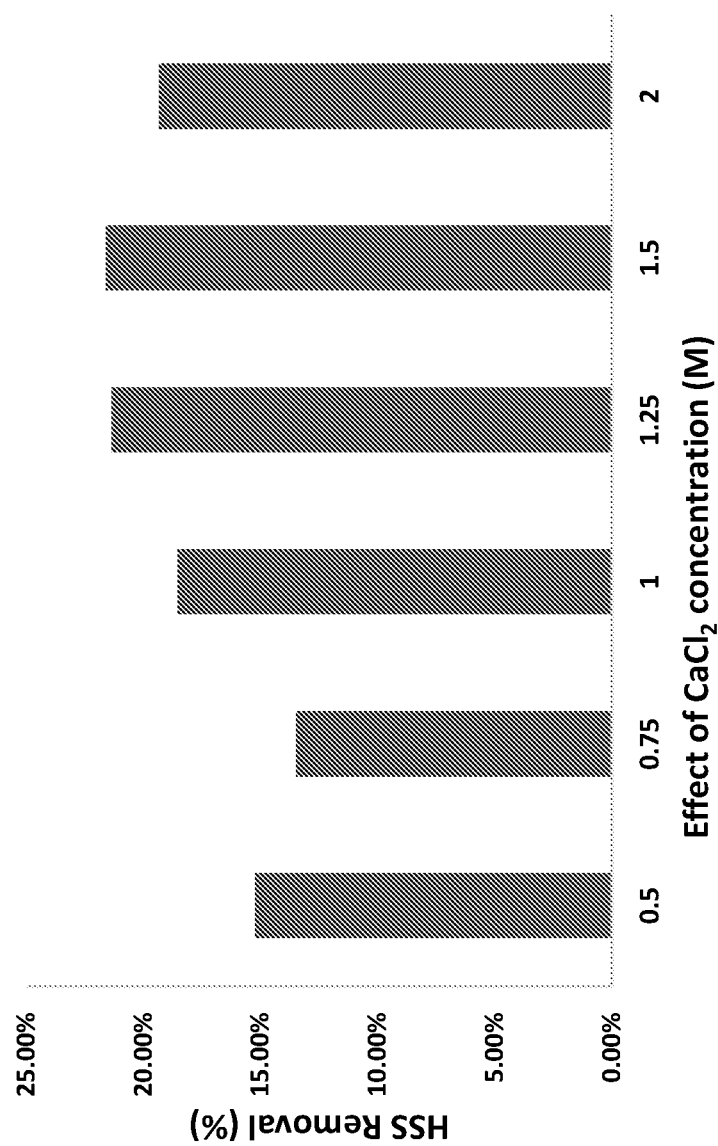
FIG. 3 shows an effect of $CaCl_2$) concentration on HSS removal.

The effect of the cross linker concentration on the amount of HSS removal is studied by varying the concentration of CaCl$_2$ from 0.5 M to 2.0 M, while preparing the magnetic composite. As shown in FIG. 3, it is observed that maximum removal of 21.36% and 21.63% was obtained for a CaCl$_2$ concentration of 1.25 and 1.5 M respectively. Also it is seen that further increase in concentration above 1.5 M resulted in a decrease in the removal percentage.

Effect of Adsorbent Dosage

Figure 4:
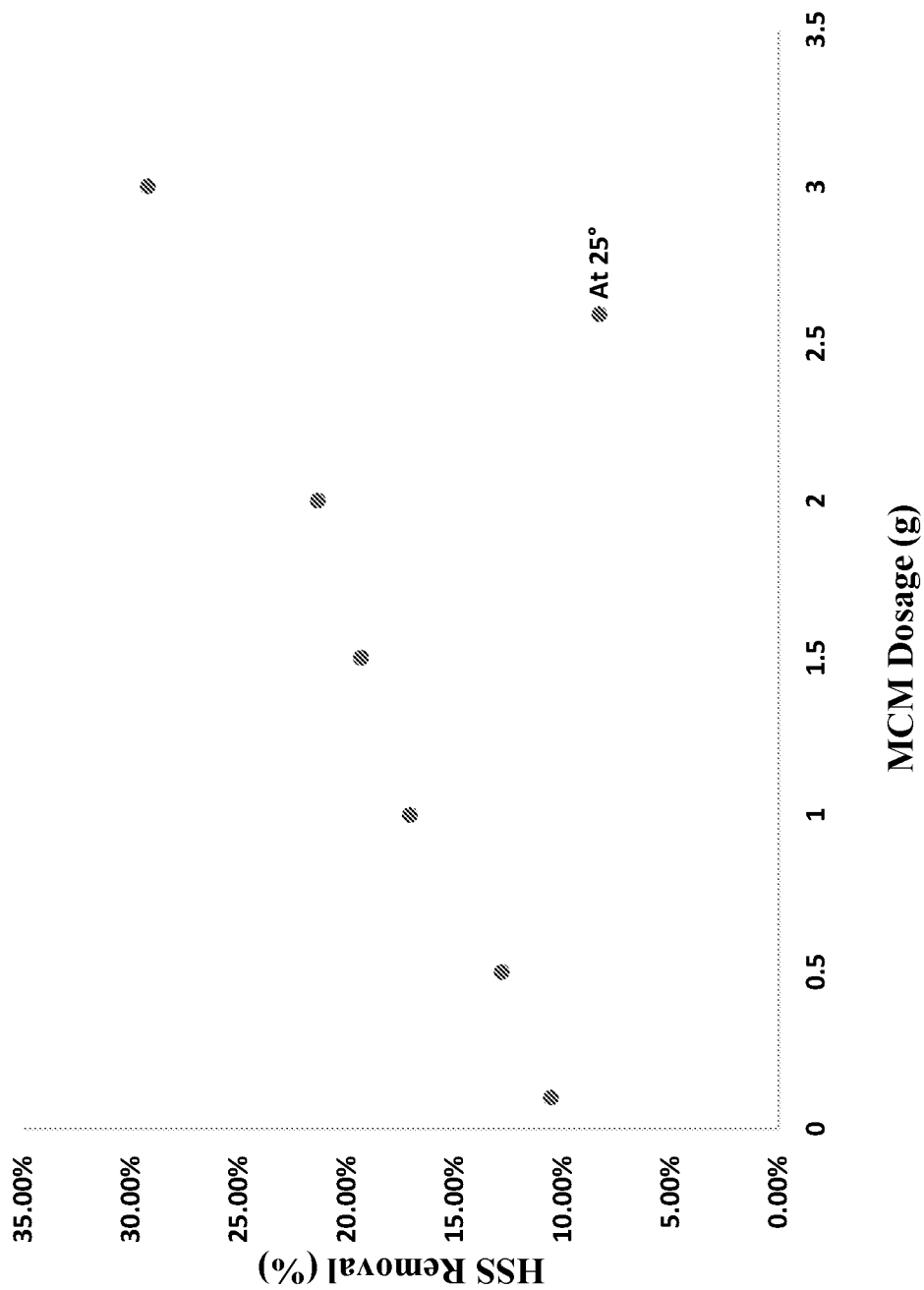
FIG. 4 shows an effect of magnetic composite microparticles dosage on HSS removal.

FIG. 4 depicts the % removal of HSS with different dosage of magnetic composite microparticles (MCM). The HSS removal is found to increase with MCM dosage.

Effect of Temperature

Figure 5:
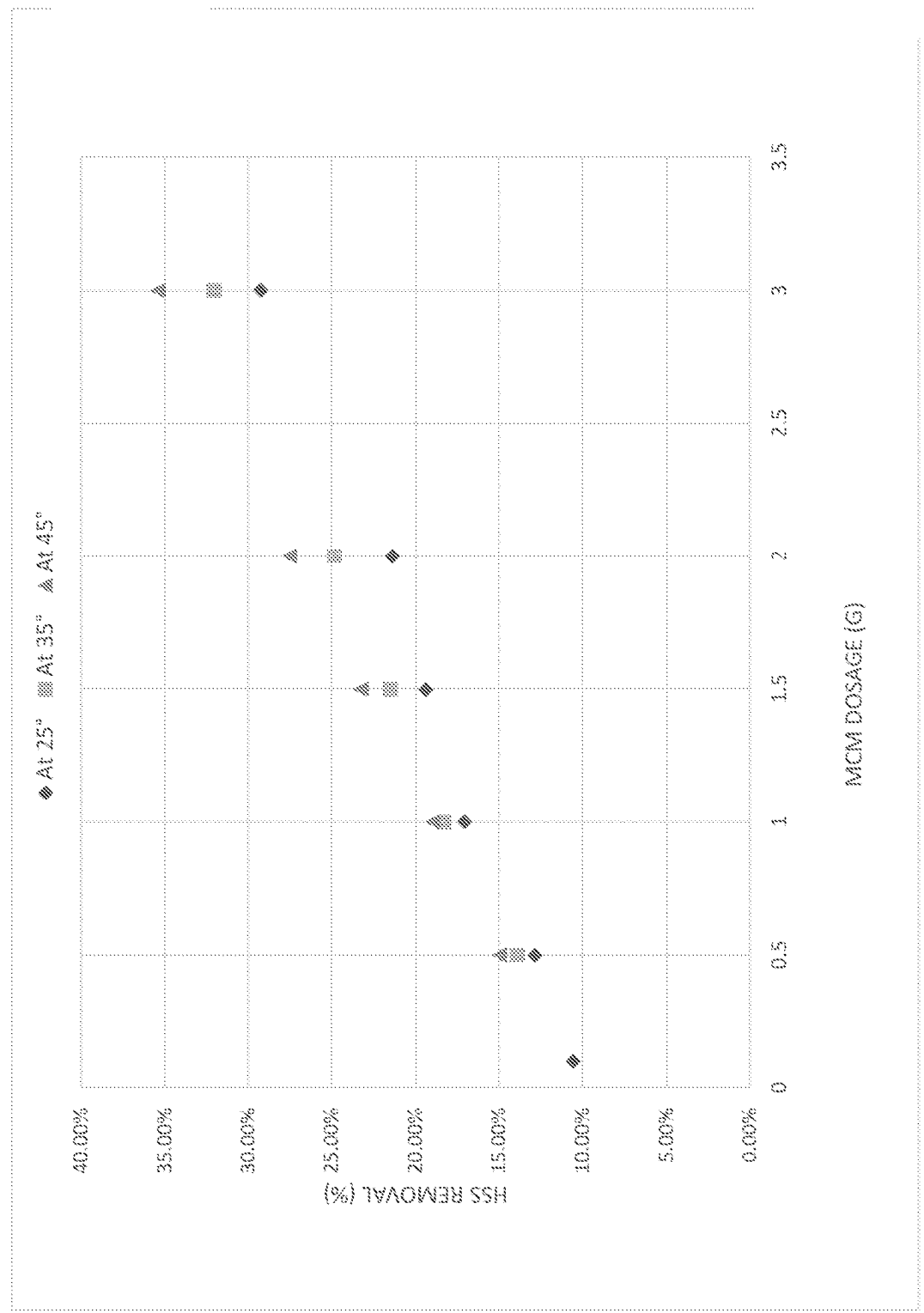
FIG. 5 shows an effect of temperature on HSS removal using magnetic composite microparticles.

The % removal of HSS with different MCM dosage at various temperatures is shown in FIG. 5.—The HSS removal is found to increase with increase in temperature confirming that the adsorption process is endothermic in nature. 3.0 g of alginate/iron oxide magnetic hydrogel composite exhibited a removal of 29.24%, 32.04% and 35.38% at 25° C., 35° C. and 45° C. respectively.

Adsorption Kinetics

Figure 6:
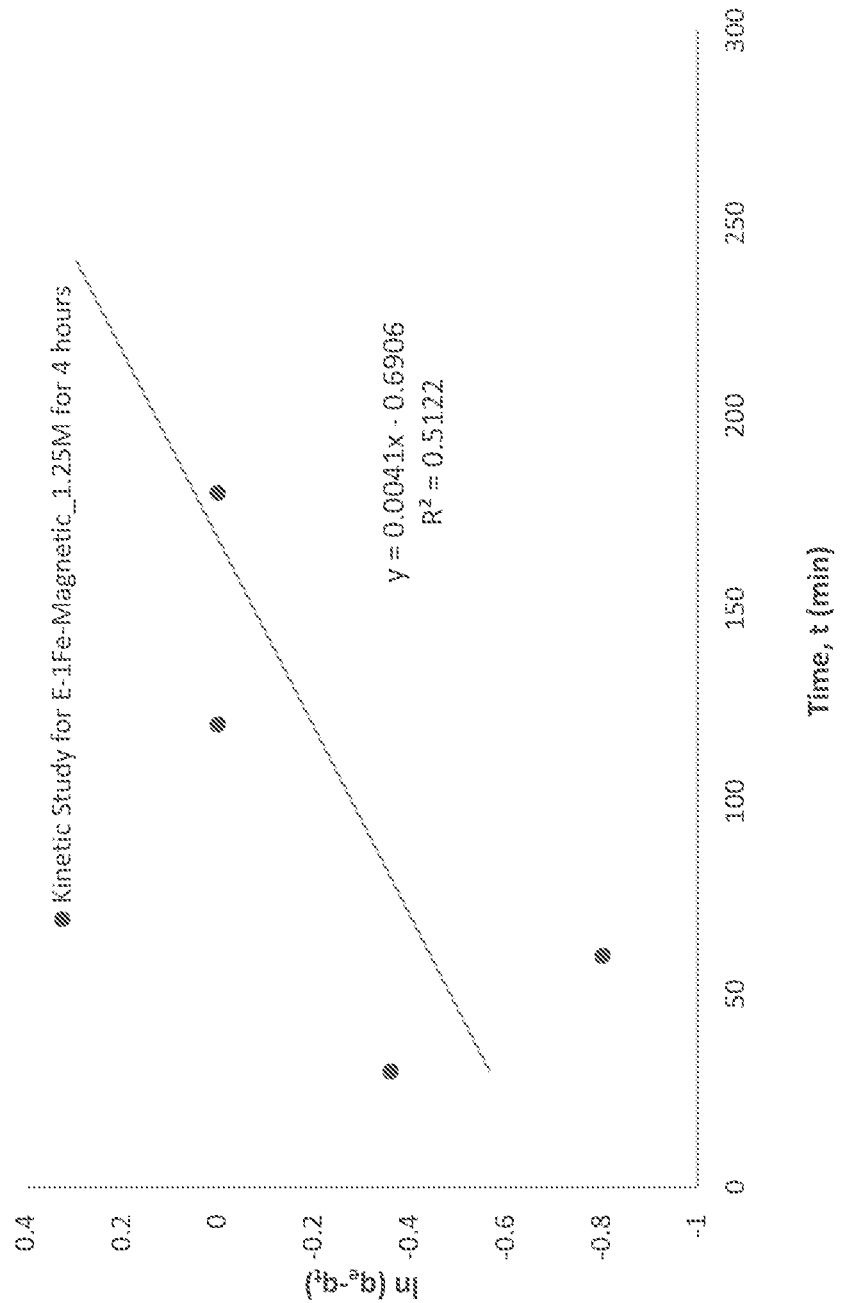
FIG. 6 shows pseudo-first-order kinetics of a kinetic study of E-1Fe-Magnetic_1.25 M for 4 hours by $\ln(q_e - q_t)$ vs. time.
Figure 7:
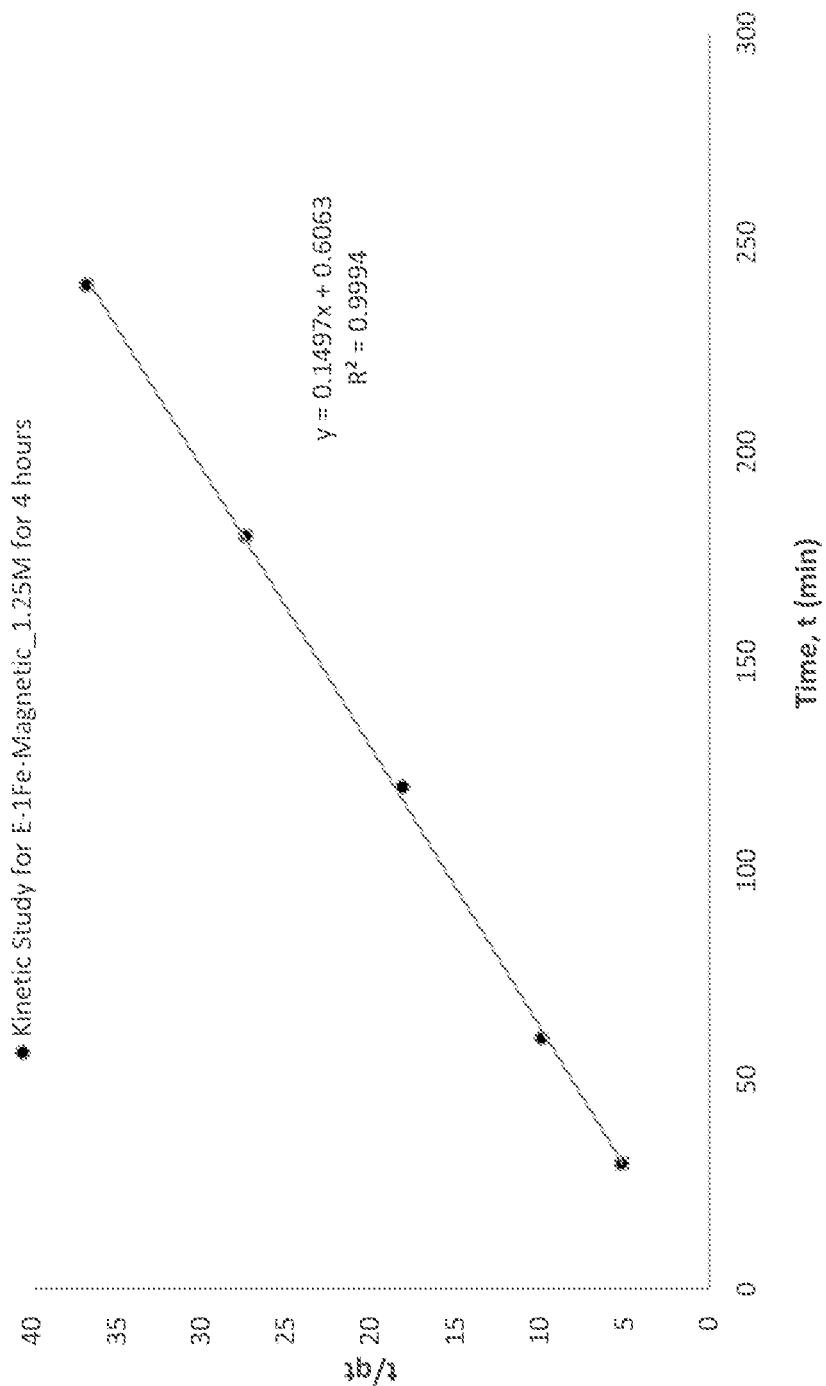
FIG. 7 shows pseudo-first-order kinetics of a kinetic study of E-1Fe-Magnetic_1.25 M for 4 hours by t/qt vs. time.
Figure 8:
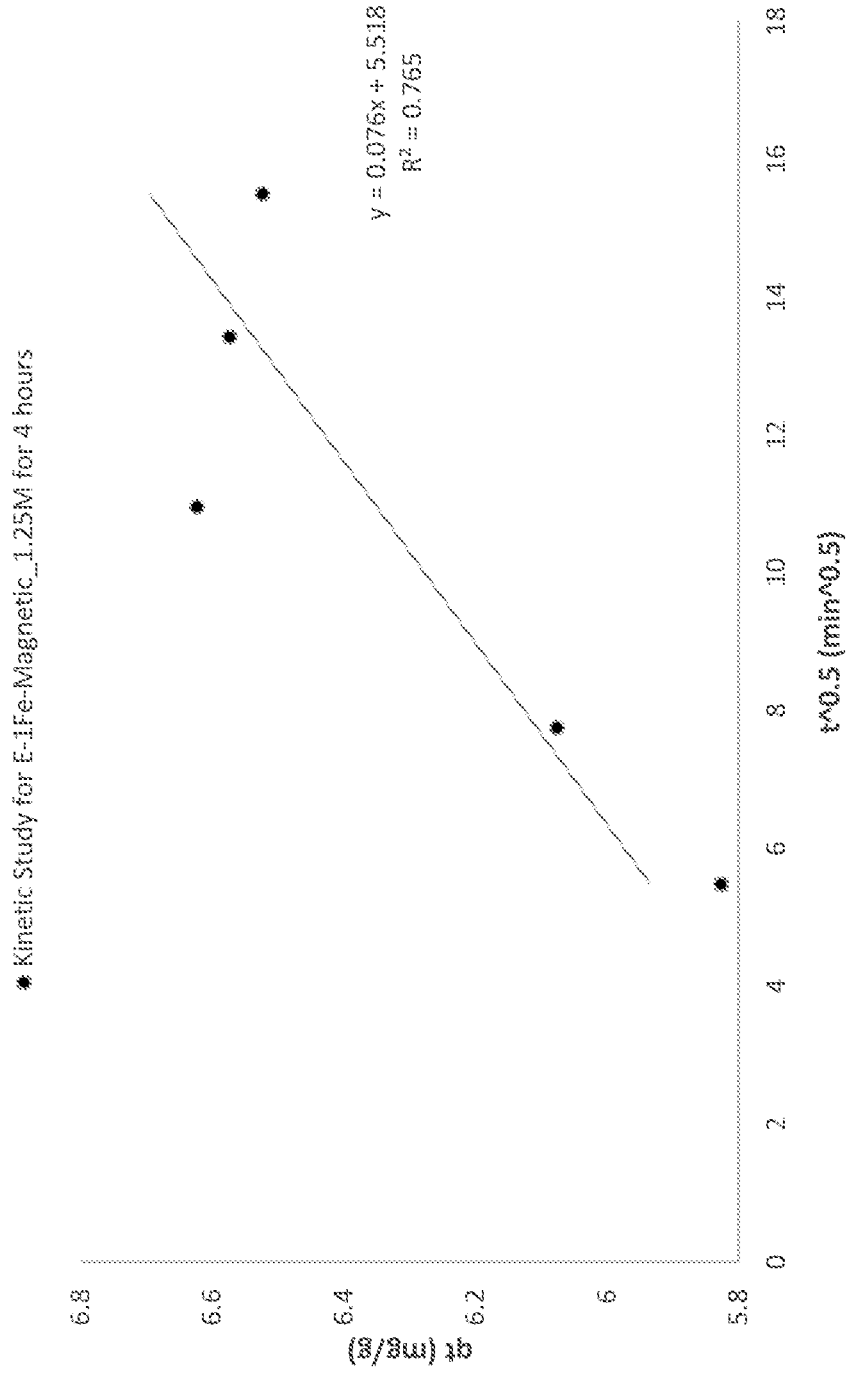
FIG. 8 shows intra-particle diffusion in a kinetic study of E-1Fe-Magnetic_1.25 M for 4 hours by qt vs. $t^{1/2}$.

For predicting the rate of HSS removal using the prepared MCM and estimating the equilibrium time, adsorption kinetics study is performed. For the kinetic study, 1.0 g of MCM is added to each of the conical flasks containing 10 ml of lean amine at room temperature. At definite time intervals, the beads are recovered using magnetic force and the lean amine samples are filtered and analyzed using UV-vis for HSS content. Different kinetics models such as pseudo-first-order, pseudo-second-order and intra-particle diffusion models are studied to analyze the experimental data. Plots of $\ln(q_e - q_t)$ versus time can be seen in FIG. 6, $t/q_t$ versus time can be seen in FIG. 7 and $q_t$ versus square root of time is given in FIG. 8. These Figures are made to predict how experimental data fits with pseudo-first-order kinetics, pseudo-second-order kinetics and intra-particle diffusion respectively. From the correlation coefficient values it can be clearly seen that the adsorption kinetics follows pseudo-second-order kinetics with a rate constant of 0.03696 and this indicates that the removal is chemical in nature which is in agreement with the endothermic nature of the batch process.

By doing these specific measurements the capacity of CMC for the removal of HSS from amine solvent can be determined. CMC can be prepared from different composite with different sizes.

The foregoing disclosure and showings made in the drawings are merely illustrative of the principles of this invention and are not to be interpreted in a limiting sense.

The invention claimed is:

1. A method for removing heat-stable salts (HSS) from an aqueous solvent, the method comprising:
 providing an aqueous solvent containing HSS;
 feeding a plurality of magnetic composite particles coated with an alginate to the aqueous solvent and mixing the plurality of magnetic composite particles with the aqueous solvent;
 separating the plurality of magnetic composite particles having at least a portion of the HSS adsorbed on the plurality of magnetic composite particles from the aqueous solvent using an electromagnetic source;
 discharging a mixture of the plurality of magnetic composite particles with the aqueous solvent after mixing the plurality of magnetic composite particles with the aqueous solvent in a mixing tank (4) to an electromagnetic separator (5) where a separation takes place by which the plurality of magnetic composite particles having at least a portion of the HSS adsorbed on the plurality of magnetic composite particles are separated from the aqueous solvent by turning on and using an electromagnetic source (6) attached to the electromagnetic separator (5);
 collecting the aqueous solvent in a treated liquid tank (7) after the separation; and
 turning off the electromagnetic source (6) and feeding a mixture of a regeneration liquid and the plurality of magnetic composite particles having at least a portion of the HSS adsorbed on the plurality of magnetic composite particles to a collecting tank (8).

2. The method according to claim 1 wherein the aqueous solvent is an aqueous amine solvent.

3. The method according to claim 2 wherein the aqueous amine solvent comprises at least one of methyldiethanolamine or alkanolamine.

4. The method according to claim 1 wherein the HSS is formed by one or more protonated amine cations and one or more anions selected from $SCN^-$, $HCOO^-$, $CH_3COO^-$, and $CH_3CH_2COO^-$.

5. The method according to claim 1 wherein the plurality of magnetic composite particles comprise iron oxide magnetic particles.

6. The method according to claim 1 further comprising feeding the mixture in the collecting tank (8) back to the electromagnetic separator (5) and turning on the electromagnetic source (6) such that the plurality of magnetic composite particles are trapped in the electromagnetic separator (5).

7. The method according to claim 6 further comprising feeding the regeneration liquid from the electromagnetic separator (5) to the collecting tank (8), and further feeding the regeneration liquid from the collecting tank (8) to the tank (3).

8. The method according to claim 7 further comprising feeding additional aqueous solvent from a tank (2) via the mixing tank (4) to the electromagnetic separator (5), turning off the electromagnetic source (6) and feeding a mixture of the plurality of magnetic composite particles and the aqueous solvent to the mixing tank (4).

9. A method for removing salts from a liquid, the method comprising:
 providing a first liquid containing at least one salt;
 feeding a plurality of magnetic composite particles to the first liquid and mixing the plurality of magnetic composite particles with the first liquid;
 separating the plurality of magnetic composite particles having at least a portion of the at least one salt adsorbed on the plurality of magnetic composite particles from the first liquid using an electromagnetic source;
 collecting the first liquid in a treated liquid tank (7) after the separation;
 feeding a second liquid as a regeneration liquid from a tank (3) to the mixing tank (4) and then to the electromagnetic separator (5); and
 turning off the electromagnetic source (6) and feeding a mixture of the second liquid and the plurality of magnetic composite particles having at least a portion of the at least one salt adsorbed on the plurality of magnetic composite particles to a collecting tank (8).

10. The method according to claim 9 further comprising feeding the mixture in the collecting tank (8) back to the electromagnetic separator (5) and turning on the electromagnetic source (6) such that the plurality of magnetic composite particles are trapped in the electromagnetic separator (5).

11. The method according to claim 10 further comprising feeding the second liquid from the electromagnetic separator (5) to the collecting tank (8), and further feeding the second liquid from the collecting tank (8) to the tank (3).

12. The method according to claim 11 further comprising feeding additional first liquid from a tank (2) via the mixing tank (4) to the electromagnetic separator (5), turning off the electromagnetic source (6) and feeding a mixture of the plurality of magnetic composite particles and the first liquid to the mixing tank (4).

* * * * *